(No Model.) 2 Sheets—Sheet 2.
R. M. SURATT.
VEHICLE WHEEL.
No. 356,383. Patented Jan. 18, 1887.
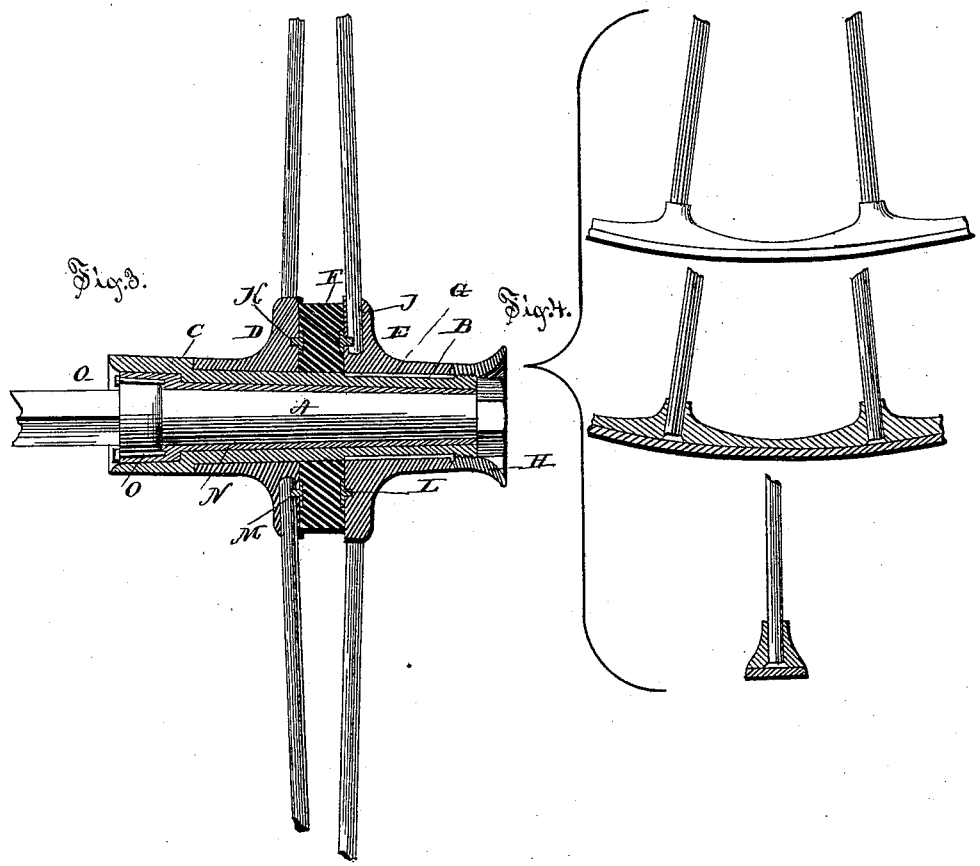
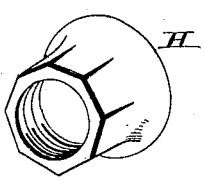
Fig. 6.
WITNESSES
INVENTOR
Attorneys

UNITED STATES PATENT OFFICE.

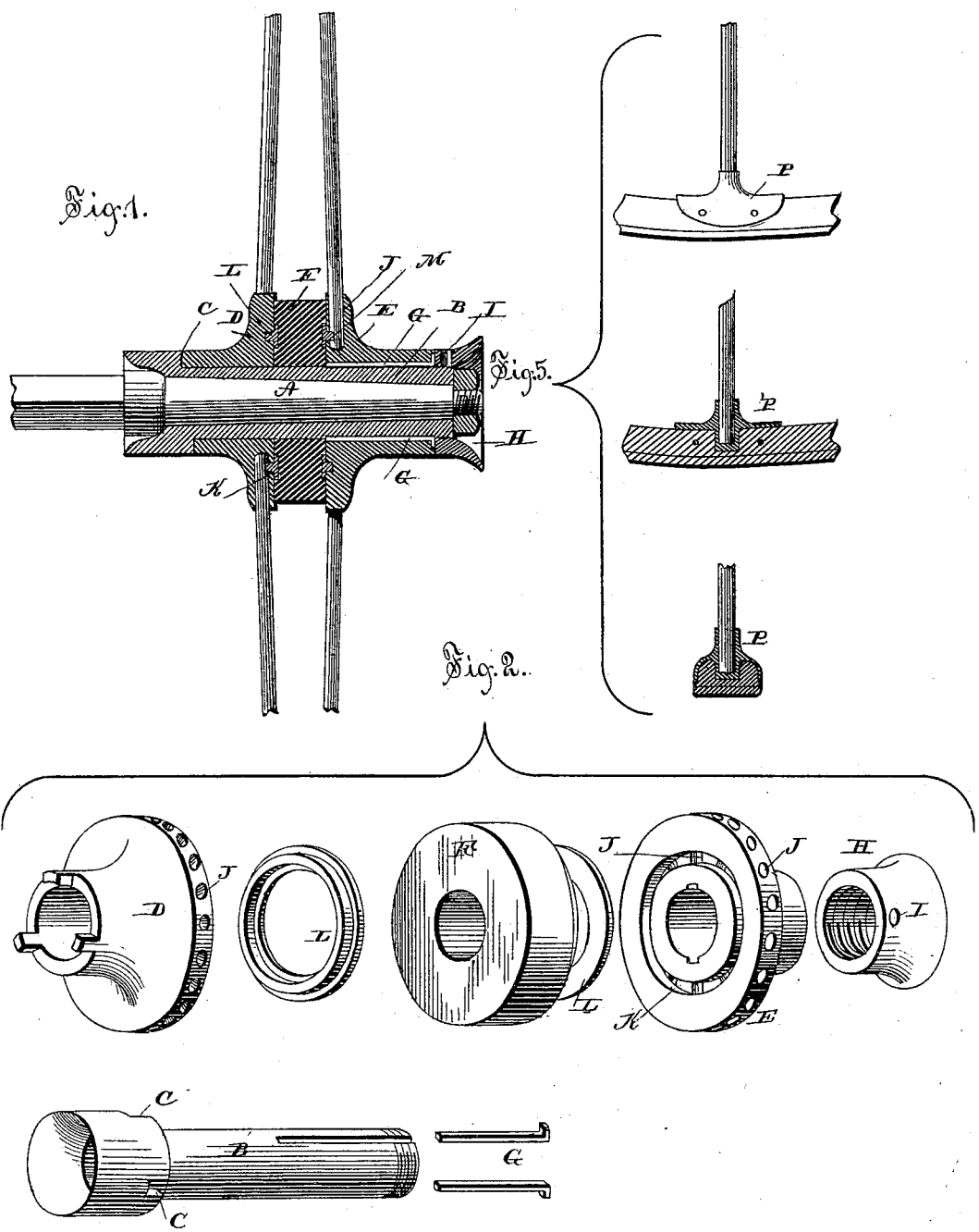

RALPH M. SURATT, OF TERRE HAUTE, IND., ASSIGNOR OF TWO-THIRDS TO JACOB J. SARGENT AND PATRICK W. STACK, BOTH OF SAME PLACE.

VEHICLE-WHEEL.

SPECIFICATION forming part of Letters Patent No. 356,383, dated January 18, 1887.

Application filed October 16, 1886. Serial No. 216,402. (No model.)

*To all whom it may concern:*

Be it known that I, RALPH M. SURATT, a citizen of the United States, and a resident of Terre Haute, in the county of Vigo and State of Indiana, have invented certain new and useful Improvements in Vehicle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is an axial section of the hub of my improved wheel. Fig. 2 represents in perspective the separated parts of the hub and box. Fig. 3 is an axial section of a hub used upon a sleeved spindle. Fig. 4 represents a portion of a metallic felly used in my wheel, said portion being shown in side elevation, cross-section, and longitudinal section, to illustrate the manner of securing the spokes in the same. Fig. 5 is a similar representation showing the manner of securing the spokes when a wooden felly is used. Fig. 6 is a perspective view of a point-band provided with an octagonal inner end.

Like letters of reference indicate corresponding parts throughout the several figures.

My invention has relation to vehicle-wheels; and it consists in the improved construction and combination of parts constituting the same, as will be hereinafter fully set forth.

The object of my invention is to so construct a wheel that by the adjustment of the point-band the tire may be tightened without removing it from the felly; furthermore, to so construct the several parts that the spokes may be secured in the hub, and that metallic or wooden fellies may be used with metallic spokes.

Referring to the accompanying drawings, A represents the axle-spindle; B, the axle-box, the inner end of which is enlarged and provided with notches C for the reception of the three projections (more or less) formed upon the inner end of the inmost half, D, of the hub. Between this half and the outmost half, E, of the hub is placed a moderately-hard rubber washer, F, whose diameter is a little less than that of the flanges of the halves between which it is placed. Keys G are driven into grooves formed in the box and the corresponding ones formed in the interior of the outmost half, and then the point-band H is turned onto the box by placing the end of a rod into the hole I, which is formed in the plain cylindrical flaring band, or by a wrench used when the band has an octagonal inner end, as seen in Fig. 6.

The flanges of the halves of the hubs are formed with radial sockets J, which are intersected upon the inner faces of each half by an annular groove, K. Into this groove fits the rib of the annular keys L. These keys resemble washers provided with a rib along the middle of one face, and when this rib is placed into said grooves the washer part bears against the face of the respective hub-half. By thus constructing said keys a greater surface is formed for the rubber washer to bear against, and any liability to displacement of said keys is avoided.

The inner ends of each of the spokes has a notch, M, cut across it, and into these notches the rib of the annular key rests and prevents any movement of the spokes in their sockets.

When a sleeve is used upon a spindle, as represented at N in Fig. 3, it is keyed to the spindle by the keys O at the inner end of said spindle, and the box is keyed to the outmost half of the hub by the key G, as before, the outer ends of which keys are turned over to afford means for withdrawing them from their seats. In all other respects the hub and box used with a sleeve are the same as used on the spindle without the sleeve.

One-half of the spokes are arranged in one hub-half alternate with the half arranged in the other hub-half, and are of necessity arranged in two planes at their inner ends, while the outer ends meet in the same line on the felly. The spokes in the outer row are enough shorter than those of the inner row to give the desired "dish" to the wheel.

When a metallic felly is used, as one of malleable iron, it is formed as shown in Fig. 4, holes for the spokes being formed through it, the spokes being first passed through the felly and into the hub, then the tire placed upon the wheel, against the inner side of which the ends of the spokes firmly bear. When the tire becomes a little loose, the point-band is tightened, which causes the rubber washer to be compressed, bringing the hub-halves nearer together, and thus forcing the spokes tighter against the tire.

If a wooden felly is used, as seen in Fig. 5, a socket, P, is attached to said felly and the spoke rested therein. These sockets are formed with a cylindrical portion, one end of which fits into a mortise formed in the felly, and from opposite sides of said socket project curved flanges, which embrace the felly and strengthen it at that point.

The several parts in the wheel may be made from any desired suitable material. When a sleeve is used upon a spindle, it should be of malleable iron, the box of brass, the hub of malleable iron, and the point-band of brass.

Having thus fully described my invention, I claim—

1. The combination of the axle-box provided with a notched enlargement upon its inner end and longitudinal grooves at its outer end, hub-halves, the inmost one of which has projections formed upon its inner end, keys for preventing the outmost hub-half from turning on the box, and the point-band, as and for the purpose specified.

2. In a wheel, the combination, with the box and point-band, of adjustable hub-halves provided with radiating sockets, and having annular grooves in their inner faces intersecting said sockets, annular keys adapted to fit in said grooves, and spokes, the inner ends of which are formed with notches to receive said keys, as specified.

3. In a wheel, the combination, with the box and point-band, of adjustable hub-halves provided with radiating sockets, and having annular grooves in their inner faces intersecting said sockets, annular keys formed with flanges upon each side and adapted to fit by their ribs into said grooves, and spokes provided with notches at their inner ends to receive the ribs of said keys, as shown and described.

4. In a wheel provided with adjustable hub-halves, each furnished with radiating sockets intersected on their inner faces by annular grooves, the combination, with notched spokes and ribbed annular keys, of a rubber washer interposed between the hub-halves and an adjustable point-band, as and for the purpose specified.

5. In a wheel, the combination of the spindle, the sleeve, keys for securing the sleeve to said spindle, the axle-box, adjustable hub-halves, a key for securing the outmost hub-half to said box, and the adjustable point-band, as shown and described.

6. The combination, with the within-described hub provided with adjustable hub-halves, rubber washer, and adjustable point-band, of metallic spokes, a metallic felly provided with holes for said spokes extending through it, and a tire adapted to bear against the ends of the spokes, as and for the purpose set forth.

In testimony that I claim the foregoing as my own I have hereunto affixed my signature in presence of two witnesses.

RALPH M. SURATT.

Witnesses:
A. B. FELSENTHAL,
J. W. BROCK.